United States Patent Office 3,662,059
Patented May 9, 1972

3,662,059
DENTIFRICE COMPOSITION
Wilfried Wiesner, West Paterson, and Morton Pader, West Englewood, N.J., assignors to Lever Brothers Company, New York, N.Y.
No Drawing. Filed June 2, 1969, Ser. No. 829,799
The portion of the term of the patent subsequent to Nov. 3, 1987, has been disclaimed
Int. Cl. A61k 7/16
U.S. Cl. 424—52                                                                     22 Claims

ABSTRACT OF THE DISCLOSURE

This disclosure relates to a dentifrice composition containing a polymer of an olefin having 2 to 3 carbon atoms, a fluorine-containing compound and a silica xerogel. This dentifrice composition has a pH of about 4.5 or less.

---

It is known that an acceptable dentifrice when used in conjunction with a toothbrush should remove from the teeth stains of various types, food debris, microorganisms and uncalcified supra gingival calculus. It should also dislodge collections of food debris and accumulations of micro-organisms from the interproximal spaces below contact areas and between teeth. An abrasive cleansing agent is generally included in the dentifrice. However, this cleansing agent must not cause too much abrasion of the enamel surface of the teeth.

It is also known that fluoride ions are beneficial in the prevention of dental caries. These fluoride ions can be administered in the drinking water or they can be applied topically to the teeth. In the past, these fluoride ions have been incorporated in a dentifrice. However, it has been difficult to provide a dentifrice having fluoride salts and a cleansing agent that maintains high anticaries activity over a long period of time, that effectively imparts the beneficial protection onto the tooth surface, that has a low pH to enhance this protective effect, and that has a minimum effect on the removal of such protection during the brushing of the tooth surface.

It has now been discovered that a dentifrice can be provided with reduced abrasiveness without an objectionable reduction in cleaning properties. Furthermore, a dentifrice having a low pH can be provided with high fluorine compatibility, with excellent storage stability and with a high reduction of enamel solubility. Thus, in accordancce with one embodiment of this invention a dentifrice is formed containing a thermoplastic polymer of a $C_2$ to $C_3$ olefin or the like, a fluorine-containing compound and a silica xerogel, with a pH of about 4.5 or less.

The silica xerogel used in this invention is defined herein as a synthetic, aggregated, amorphous, highly porous silica having an average particle diameter of between about 2 and 20 microns, preferably about 4 to 15 microns. The silica xerogel used in the invention generally has a surface area of at least 400, preferably 600–1000, square meters per gram, as determined by nitrogen adsorption. The silica xerogels defined herein are known in the art [The Colloid Chemistry of Silica and Silicates, Iler, pages 127–180, Cornell University Press (1955)]. There exist many forms of amorphous silica, including silica gels, non-porous precipitates, and pyrogenic materials. All can be considered as poly-condensation products of orthosilicic acid, $Si(OH)_4$. The physical structure of amorphous silica is represented by a system of poly-condensation units or primary particles consisting of irregular, three-dimensional networks of $SiO_4$ tetrahedra, the size and packing of which determine the exact geometry of the structure. The only difference between gels and precipitates is the degree and strength of packing in the silica aggregates. Silica gells have been disclosed as being suitable for various compositions (U.S. Pat. No. 3,250,680 and Swiss Pat. No. 280,671). However, the term "silica gel" encompasses a very broad spectrum of materials with identical chemical composition but widely varying physical properties. Depending on the method of manufacture, a silica gel can be tightly packed or porous, on the order of angstrom units or microns in particle size, regular or irregular in particle shape, mechanically weak or mechanically strong, agglomerated or in the form of individual particles, hydrated or anhydrous, reversibly or irreversibly dehydrated (if deyhdrated), and with more or less surface silanol groups. Accordingly, the defined silica xerogels exclude crystalline silica, silica sol (or colloidal silica), precipitated silica and pyrogenic silica; and other silica gels, i.e., aerogel silicas.

Since the silica xerogel is highly porous, it has an extremely high cleaning ability but does not harmfully abrade the tooth enamel surface as do nonporous silicas of equal or smaller particle diameter. The silica xerogel used herein imparts unusually high luster to dental enamel. The dentifrice generally has about 5 to 20 parts, preferably 8 to 15 parts, of this silica which is also highly pure and compatible with therapeutic agents.

The aforementioned silica xerogel may be prepared by the addition of a mineral acid, e.g., sulfuric acid, to a sodium silicate solution. A hydrosol is then formed which is allowed to gel to a hydrogel. The hydrogel consists of a three-dimensional network of polymerized silica units. Each of these units, also referred to as ultimate particles, has an approximate size of 5–15 millimicrons. Several different types of silica gels are obtained depending on among other factors, the rate of drying or, generally, the type of water displacement in the initial gel. In the preparation of the xerogels which are within the scope of this invention the initial hydrogel is slowly washed and dried keeping the pH during this operation at about 4. During the slow washing and drying step, a strong shrinkage of the network structure occurs reducing the average pore diameter. The resulting porous structure is the reason for the large surface area of the xerogel, e.g., 400–1000 $m.^2/g.$, almost all due to internal surface area. The small size of the pores also contributes to the overall rigidity of xerogel particles making them ideal abrasive particles.

Suitable specific silica xerogels for this invention, among others, have an average particle diameter of about 4 or 10 microns and they are manufactured by Grace, Davison Chemical Co. under the trade names Syloid 65 and Syloid 63, respectively. These products are described in "The Davison Family of Syloid Silicas" published by Grace, Davison Chemical Co. which is incorporated herein by reference.

Aerogel silicas, which are not within the scope of the invention, are obtained by washing the original gel and then removing the water from the initial hydrogel by means which avoid shrinkage of the gel, such as by a steam micronizing process. The final product generally has a pore diameter in excess of about 10 millimicrons. The bonds between the ultimate particles are less rigid, thus facilitating a breakdown of the agglomerate particle into smaller submicron units. The surface area of commercially available aerogels is usually about 200–300 $m.^2/g.$, as determined by the nitrogen adsorption method. The silica aerogel particularly exhibits a porous sponge-like structure. The "walls" of this structure are made up of the same ultimate silica particles as those of the xerogel. The elementary silica particles which provide the structure of the aerogel "walls" are less dense than the xerogel particles and are aggregated only loosely, and thus the structure can be broken down by the application of only moderate shearing and mechanical forces. As a consequence, the silica aerogel alone is not suitable for dentifrice abrasive applications. Not only will it break down too quickly under the force exerted through a toothbrush but it probably undergoes substantial degradation under the forces encountered in normal toothpaste mixing operations.

The dentifrice of the present invention also contains a particulate organoleptic agent which is a homopolymer of a $C_2$ to $C_3$ olefin or the like. This polyolefin, e.g., polypropylene and polyethylene, reduces the abrasiveness of the aforementioned silica without reducing to any great extent its cleaning properties. The polyolefins are well known thermoplastic polymers, and they may be prepared by any suitable method. The polyolefins employed in the invention have an average particle size between about 1 and 50 microns, preferably between 5 and 15 microns. The dentifrice generally has about 17 to 40 parts, preferably about 20 to 30 parts, polypropylene or low, medium or high density polyethylene.

Another required component in the dentifrice is one or more water-soluble ionizable fluorine-containing compounds. These compounds which are beneficial in the prevention of dental caries are well known in the art. The following, among others, are suitable: sodium fluoride, lithium fluoride, stannous fluoride, potassium fluoride, ammonium fluoride, sodium fluostannite, stannous chlorofluoride, sodium monofluorophosphate and mixtures thereof. The fluorine-containing compounds (calculated as fluoride ions) may range from about 0.01 to 2 parts by weight of dentifrice.

Although not an essential ingredient, the dentifrice may have other therapeutic agents, such as germicides, antibiotics, astringents and mixtures thereof. This includes without limitation the following: tyrothrycin, chlorophyllins, Hexachlorophene [2,2'-methylene-bis(3,4,6-trichlorophenol)], tribromosalicylanilide, polybromosalicylanilide, the sarcosides and astringent salts. When employed these therapeutic agents may range from about 0.01 to 2 parts by weight of dentifrice.

The dentifrice of this invention may also contain one or more other optional ingredients well known for use in toothpastes and tooth powders. Without limitation, these include the following: water; soaps and synthetic detergents, e.g., water-soluble alkyl and alkyl ether sulfates and sulfonates having alkyl groups with 8 to 18 carbon atoms, water-soluble salts of sulfonated monoglycerides of fatty acids having from 10 to 18 carbon atoms, water-soluble salts of sulfated fatty alcohols having from 10 to 18 carbon atoms, salts of fatty acid amides of taurines, such as sodium-N-methyl-N-palmitoyl tauride, salts of fatty acid esters of isethionic acid, and substantially saturated aliphatic acyl amides of saturated aliphatic monoamino carboxylic acids having 2 to 6 carbon atoms and in which the acyl radical contains 12 to 16 carbon atoms, such as sodium N-lauroyl sarcoside; flavoring agents; oxygen-releasers, e.g., perborate; buffers, sweeteners, e.g., saccharin; humectants; preservatives; coloring materials; carriers and softeners, e.g., glycerine, sorbitol, ethyl alcohol, mineral oil, syrup, glucose, invert sugars, glycols and honey; and binders, e.g., gum tragacanth, sodium carboxymethylcellulose, hydroxyethylcellulose, Indian gum, Irish moss, carragheen, starch, acacia gums, agar agar, locust bean gum, pectin and petrolatum. The aforementioned optional ingredients in the dentifrice may be incorporated in the following ranges: about 0 to 70 parts carriers and softeners; about 0 to 30 parts binders; about 0 to 5 parts flavoring agents; about 0 to 60 parts water; about 0 to 10 parts buffers; about 0 to 2 parts preservatives; and about 0 to 6 parts soaps and synthetic detergents as surface tension depressants.

The dentifrice, e.g., a paste and a powder, of this invention may be prepared by any suitable method. In general, the dentifrice is formed merely by blending together the aforementioned ingredients.

Thus, in accordance with the present invention, it is now possible to form an improved dentifrice having a pH of about 4.5 or less, e.g., about 2.5 to 4. It is significant that the polymer and silica in the dentifrice of the invention are compatible at this low pH. This dentifrice has a high reduction of enamel solubility and reduced abrasion thus removing from tooth surfaces a minimum of fluoride protection afforded by topical treatment with fluoride solutions or the dentifrice, while maintaining cleaning efficiency. The dentifrice of the invention also has high fluoride compatibility and is stable when stored for a long time period.

The examples included herebelow are submitted to illustrate but not limit this invention. Unless otherwise stated, all parts and percentages in the specification, examples and claims are based on weight. In the examples, tests were conducted on the resulting toothpastes of the invention in accordance with the following procedures.

ENAMEL ABRASION TEST

Abrasion testing (enamel loss) was done by measuring the thickness of extracted human teeth before and after each brushing with a given dentifrice; any difference represented enamel loss. The test tooth was first conditioned by storage in tap water until the thickness measurements were constant and remained constant for three successive days. The tooth was mounted in the bottom of a metal cup directly below a revolving brush of the type used by dentists in prophylactic work. The slurry of the test product was then poured into the cup and the machine was operated. The cup and tooth were moved slowly back and forth beneath the revolving brush for a period of one hour unless otherwise indicated. The tooth thickness was then remeasured. The abrasion loss represents the difference between the initial and final measurements of tooth thickness. Results on three teeth were averaged to obtain the abrasion loss value. The desirable region of abrasion in this test is considered to be from 0 to about 5 microns.

Surface effects evaluation to determine the presence and extent of pits, scratches and grooves was done by microscopic examination at a magnification of 57× of teeth brushed with the dentifrice, whose surface had first been made pit and scratch free by polishing with a suitable abrasive.

CLEANSING TEST

The cleansing ability of the dentifrices was evaluated in vitro using the following technique.

A modified, blue-tinted, zein film was applied to a copper alloy surface. This surface was then brushed for 6 minutes with a slurry containing 1 part dentifrice and 2 parts water using the reciprocating brushing action of a standard brushing machine yielding 150 double strokes per minute. The brushing head was equipped with flat bristle heads of medium nylon brushes. A weight of 230 grams was placed on top of the brushing head.

Composition and preparation of zein solution

| Ingredients: | Parts by weight |
|---|---|
| Zein | 100. |
| Tripropylene glycol | 90 Group A. |
| Isopropyl alcohol (91%) | 488 Group A. |
| Formaldehyde (37%) | 30 Group A. |
| Ammonium thiocyanate | 4. |
| Water | 100 Group B. |
| Ammonia (28%) | 30 Group B. |
| FDC Blue No. 1 | 1 Group B. |

The zein was added gradually to the Group A ingredients. The system was agitated vigorously until all of the zein was completely dissolved. The ammonium thiocyanate, a catalyst for the polymerization of formaldehyde with zein, was added and the solution was allowed to cure for 2½ hours with constant agitation. At the end of this time the cure was inhibited by addition of Group B ingredients. Agitation was continued for an additional 30 minutes. All operations were conducted at room temperature.

Preparation of the coated copper alloy strips

Copper alloy strips having the dimensions 2 15/16" x 3/4" x 1/16" were thoroughly cleaned with emery cloth, grade 2, followed by emery cloth, grade 2/0, rinsed with water and dried. Zein solution was applied by immersing the strips in the zein prepartion and drip-drying at room temperature in the vertical position (with respect to the length of the strips) for about 2 to 6 minutes. During the period of drip-drying excess solution was removed from the back and the edges of the strips. The coating was then baked for 2 hours at 105° C. to 120° C. in a horizontal position. After cooling to room temperature the samples were ready for use.

The evaluation of the degree of abrasion of the zein film is only semi-quantitative, i.e., the strips were compared visually to a standard strip brushed with a slurry of one part regular Pepsodent toothpaste and 2 parts water and a second strip brushed with water, Pepsodent is a conventional commercial dicalcium phosphate dihydrate toothpaste containing on the order of 50% of this ingredient. Each slurry was run three times. While water brushing did not remove any discernible amount of film, brushing with Pepsodent toothpaste removed a substantial amount.

During the testing of all dentifrices a Pepsodent toothpaste standard and a water standard were run simultaneously in order to allow for variations in resistance of zein films from test to test.

REDUCTION OF ENAMEL SOLUBILITY TEST

The test for reduction of enamel solubility (RES) was performed as follows:

A minimum of 6 molar teeth are pumiced to remove all plaque and debris. All lesions and root sections are covered with nail polish. A 2:1 diluent:paste slurry is prepared for both a placebo and the corresponding test dentifrice. Each molar, held manually, is immersed in the placebo slurry and brushed for 2 minutes with an automatic toothbrush. The molar is then rinsed with distilled water and etched in 0.8 ml. of 0.2 molar acetate buffer at a pH of 4 for 5 minutes. The same procedure is repeated using the test slurry. All buffer samples are analyzed for their phosphorous content and the percent change in the solubility of phosphorous, prior and subsequent to test treatment, is recorded at percent RES. The greater the reduction in enamel solubility (percent RES) obtained by treating the enamel surface of a tooth with a therapeutic dentifrice the more effective the dentifrice is considered to be.

TEST FOR REMOVAL OF FLUORIDE PROTECTION

Sets of a minimum of 6 molar teeth were scaled and cleaned with pumice. The root sections were removed and all surfaces except the one to be treated were covered with sticky wax. Each set was etched for 15 minutes by immersion in 1.0 ml. per tooth of 0.2 M acetic acid at pH 4. The sets were then immersed in aqueous solution containing 0.14% $SnF_2$ (333 p.p.m. fluoride) for 4 minutes. Each tooth in each set was then brushed for 30 minutes with 1:2 aqueous slurries of the test dentifrice, using the reciprocating action of a standard brushing machine yielding 150 double strokes per minute. The teeth were then rinsed with distilled water, dried and etched as previously described. The difference in enamel solubility prior to $SnF_2$ treatment and subsequent to brushing was used as an indicator of the amount of fluoride protection still remaining after brushing with the test dentifrices.

A Protection Factor from 0.7 to 1.0 is desirable in this invention. A Protection Factor below about 0.7 is considered to indicate a removal of an undesirable amount of fluoride protection. For the evaluation of the Protection Factor it is necessary to select a test dentifrice without any fluoride-containing compound. The Protection Factor was determined as follows:

$$\text{Protection Factor} = \frac{\text{RES with test paste brushing}}{\text{RES without brushing}}$$

FLUORIDE AVAILABILITY TEST

Fluoride availability for these dentifrices containing a fluoride was measured by the following test procedure.

A 10 g. sample of dentifrice is dispersed in 100 ml. of distilled water. The slurry is then centrifuged at 2800 to 3000 r.p.m. for one hour. The fluoride is then determined in a sample of the clear supernatant. The amount of water-extractable fluoride found in the supernatant is expressed in percent of the total fluoride present in the dentifrice sample.

GERMICIDAL ACTIVITY TEST

Germicidal activity for those dentifrices containing a germicide was determined by the buccal tissue count test (BTC-test) which was conducted in the following manner.

Buccal epithelial scrapings were obtained from a subject's mouth by means of a curette. This was done by scraping the inside of either cheek with several strokes until the cup-like receiver of the curette was filled with a mixture of mucus-epithelial detritus. The tissue was transferred from the curette by agitation into 10 ml. sterile 0.1% peptone water contained in a screw-capped test tube. The contents were shaken thoroughly, diluted so as to result in "countable" plates (30–300 colonies), and 1 ml. aliquots in duplicate plated directly into Blood Agar Base (Difco). Counts were made after 48 hours incubation at 37° C. The antiseptic action of dentifrices on oral flora was evaluated by running BTC's before and 3 hours after use of the dentifrices. The reduction is expressed in percent.

EXAMPLE I

A dentifrice was prepared from the following ingredients:

| Ingredients: | Percent |
| --- | --- |
| High density polyethylene powder | 20.00 |
| Silica xerogel [a] | 12.00 |
| Hydroxyethyl cellulose | 0.95 |
| Blue dye solution (1%) | 0.03 |
| Titanium dioxide ($TiO_2$) | 0.20 |
| Saccharin | 0.30 |
| Glycerin | 36.55 |
| Polyethylene glycol [b] | 5.00 |
| Stannous fluoride ($SnF_2$) | 0.41 |
| Flavor | 1.30 |
| Sodium lauryl sulfate | 1.26 |
| Water | 22.00 |
| | 100.00 |

[a] Syloid 63; 10 micron average particle size.
[b] Carbowax 400; Union Carbide Co.

Various tests were performed on the dentifrice and the results are as follows:

Abrasion (3 hrs.): 1 micron
Cleansing: Similar to the control Pepsodent dentifrice
Surface effects: Some scratching but less than a commercially available dentifrice based on calcium pyrophosphate
Available fluoride: 70%
Available tin: 50%
pH: 3.5 (25% slurry in water)
Aging 6 months: Availability was not appreciably affected
RES (percent at room temperature in water): 66±7.

EXAMPLE II

The ingredients indicated herein were combined to form a dentifrice for comparative purposes.

Ingredients: Percent
- Silica xerogel of Example I _____ 12.00
- Silica aerogel [a] _____ 5.00
- Hydroxyethyl cellulose _____ 1.50
- Blue dye solution (1%) _____ 0.03
- Saccharin _____ 0.20
- Glycerin _____ 39.50
- Stannous fluoride _____ 0.41
- Flavor _____ 1.10
- Sodium lauryl sulfate _____ 1.26
- Water _____ 39.00

100.00

[a] 3 micron average particle size.

The results of various tests on the dentifrice are as follows:

Abrasion (3 hours): 8 microns
Cleansing: Same as in Example I
Surface effects: Same as in Example I

EXAMPLE III

The ingredients indicated herebelow were combined to form a dentifrice also for comparative purposes.

Ingredients: Percent
- High density polyethylene powder _____ 25.00
- Zirconium silicate [a] _____ 10.00
- Titanium dioxide _____ 0.20
- Hydroxyethyl cellulose _____ 0.90
- Saccharin _____ 0.30
- Glycerin _____ 35.70
- Polyethylene glycol of Example I _____ 5.00
- Stannous fluoride _____ 0.41
- Blue dye solution (1%) _____ 0.03
- Flavor _____ 1.20
- Sodium lauryl sulfate _____ 1.26
- Water _____ 20.00

100.00

[a] 1.5 micron average particle size.

The results of various tests on the dentifrice are as follows:

Abrasion (3 hrs.): 24 microns
Cleansing: Poor as compared with the control Pepsodent dentifrice
Surface effects: Considerable ridging but not as defined as a commercial dentifrice based on calcium pyrophosphate It is evident from Examples I, II and III that the dentifrice of the invention having both polyethylene and a specific silica xerogel is superior to a dentifrice having the specific silica xerogel without polyethylene and is superior to a dentifrice having polyethylene and zirconium silicate.

EXAMPLE IV

A dentifrice was formed from the same ingredients as in Example I except that the $SnF_2$ was 0.57% instead of 0.41% with a corresponding decrease in glycerine.

The test results for the dentifrice are as follows:

pH: 3.5
Cleansing: Same as Example I
Available fluoride: 76% (after 2 weeks aging)
Available tin: 61% (after 2 weeks aging)

EXAMPLE V

A dentifrice was also formed from the same ingredients as in Example I except that low density polyethylene (8.5 micron average particle size; Microthene Type 620M of U.S.I. Chemical Co.) was used instead of high density polyethylene and except that the hydroxyethyl cellulose was 0.8% instead of 0.95% with the glycerine content being adjusted accordingly.

The test results for the dentifrice are as follows:

pH: 3.5
Abrasion: 2 microns
Cleansing: Same as Example I
Available fluoride: 70% (after 2 months aging)
Available tin: 30% (after 2 months aging)
RES (percent at room temperature in water): 62±2

The RES values of the dentifrices of Example I and Example V were compared with other dentifrices. The following results were obtained.

Dentifrice: RES [a]
- Example I _____ 66±7
- Example V _____ 62±2
- Commercial [b] _____ 46±6
- Commercial [c] _____ 36±17
- Commercial [d] _____ 36±9
- Experimental [e] _____ 32±5
- $SnF_2$ (8% solution) _____ 72±14

[a] Percent at room tempertaure in water.
[b] Calcium pyrophosphate-$SnF_2$ (Crest).
[c] Buffered IMP-calcium pyrophosphate-$SnF_2$ (Pepsodent Fluoride.)
[d] IMP-soluble orthophosphate-NaF (Ipana with Durenamel).
[e] IMP-calcium pyrophosphate-$SnF_2$.

Examples I and V demonstrate the superiority of the dentifrices of this invention to reduce enamel solubility.

EXAMPLE VI

From the ingredients listed herebelow, a dentifrice was prepared.

Ingredients: Percent
- Low density polyethylene of Example V ___ 25.00
- Silica xerogel [a] _____ 10.00
- Titanium dioxide _____ 0.20
- Hydroxyethyl cellulose gum _____ 1.00
- Saccharin _____ 0.30
- Glycerin _____ 35.60
- Water _____ 20.00
- Polyethylene glycol of Example I _____ 5.00
- Stannous fluoride _____ 0.41
- Blue dye solution (1%) _____ 0.03
- Flavor _____ 1.20
- Sodium lauryl sulfate _____ 1.26

100.00

[a] Syloid 65; 4 micron average particle size.

This dentifrice had a pH of 3.5 and the cleansing was acceptable.

EXAMPLE VII

A dentifrice was prepared from the following ingredients.

Ingredients: Percent
- Polypropylene [a] _____ 20.00
- Silica xerogel of Example I _____ 12.00
- Hydroxyethyl cellulose _____ 0.80
- $TiO_2$ _____ 0.20
- Saccharin _____ 0.20
- Glycerin _____ 41.90
- Water _____ 22.00
- $SnF_2$ _____ 0.41
- Blue dye solution (1%) _____ 0.03
- Flavor _____ 1.20
- Sodium lauryl sulfate _____ 1.26

100.00

[a] Pro-Fax PA-465; Hercules Powder Co.

This dentifrice was subsequently tested and the results are as follows:

pH: 3.5
Abrasion: 4 microns
Cleansing: Same as in Example I
Available fluoride: 70%

EXAMPLE VIII

A dentifrice was formed which is the same as Example I except that it contains 1.1% of flavor instead of 1.3% and it also contains 0.05% Hexachlorophene and 0.05% polybromosalicylanilide with glycerine content being adjusted accordingly.

EXAMPLE XI

A dentifrice was formed which is the same as Example VIII except that it contains tribromosalicylanilide instead of polybromosalicylanilide.

The dentifrices of Examples VIII and IX were subjected to the buccal tissue count test (BTC-test). The BTC was taken in the morning prior to using the dentifrices. After brushing independently for 1 minute with the dentifrices, the percent mean reduction in BTC (geometric mean) was observed in 3 hours.

| Dentifrice | Average percent reductions | Number of subjects |
|---|---|---|
| Example: | | |
| VIII | 85.5 | 12 |
| IX | 79.3 | 30 |
| Control | 19.2 | 10 |

EXAMPLE X

By using the same ingredients as in Example I, except for the omission of $SnF_2$, a dentifrice was provided in order to determine the Protection Factor. The glycerin, gum and water content was adjusted accordingly.

The Protection Factor was determined to be 0.75.

Having set forth the general nature and specific embodiments of the present invention, the true scope is now particularly pointed out in the appended claims.

What is claimed is:

1. A dentifrice composition comprising about 17 to 40 parts of thermoplastic polymer of a $C_2$ to $C_3$ olefin, about 5 to 20 parts of silica xerogel and about 0.01 to 2 parts of a water-soluble ionizable fluorine-containing compound calculated as fluoride ions; said composition having a pH of about 4.5 or less.

2. The composition according to claim 1 in which the polymer is polyethylene.

3. The composition according to claim 1 in which the polymer is polypropylene.

4. The composition according to claim 1 in which the silica xerogel has an average particle diameter of about 10 microns.

5. The composition according to claim 1 in which the silica xerogel has an average particle diameter of about 4 microns.

6. The composition according to claim 1 in which the fluorine-containing compound is sodium fluoride, lithium fluoride, stannous fluoride, potassium fluoride, ammonium fluoride, sodium fluostannite, stannous chlorofluoride, sodium monofluophosphate or mixtures thereof.

7. The composition according to claim 1 in which the silica xerogel has a surface area of at least 400 square meters per gram.

8. The composition according to claim 1 which further contains a germicide.

9. The composition according to claim 1 which further contains an antibiotic.

10. The composition according to claim 1 which further contains an astringent.

11. The composition according to claim 1 which further contains water.

12. The composition according to claim 1 which further contains a soap.

13. The composition according to claim 1 which further contains a synthetic detergent.

14. The composition according to claim 1 which further contains a flavoring agent.

15. The composition according to claim 1 which further contains an oxygen releaser.

16. The composition according to claim 1 which further contains a buffer.

17. The composition according to claim 1 which further contains a sweetener.

18. The composition according to claim 1 which further contains a humectant.

19. The composition according to claim 1 which further contains a preservative.

20. The composition according to claim 1 which further contains a coloring material.

21. The composition according to claim 1 which further contains a carrier.

22. The composition according to claim 1 which further contains a softener.

References Cited

UNITED STATES PATENTS

| | | | |
|---|---|---|---|
| 3,070,510 | 12/1962 | Cooley et al. | 424—52 |
| 3,538,230 | 11/1970 | Pader et al. | 424—50 |
| 3,325,368 | 6/1967 | Wood | 424—57 |

OTHER REFERENCES

Trademark to Close-up, No. 818,419, registered Nov. 8, 1966 shows first commercial use of product Mar. 14, 1966.

RICHARD L. HUFF, Primary Examiner

U.S. Cl. X.R.

424—50, 53

17857

PO-1050
(5/69)

UNITED STATES PATENT OFFICE
CERTIFICATE OF CORRECTION

Patent No. 3,662,059          Dated May 9, 1972

Inventor(s) Wilfried Wiesner and Morton Pader

It is certified that error appears in the above-identified patent and that said Letters Patent are hereby corrected as shown below:

Column 1, line 23, "microorganisms" should be --micro-organism--;
           line 48, "accordancce" should be --accordance--:

line 66, "Si(OH)$_4$)." should be --Si(OH)$_4$.--;
           line 72, "gells" should be --gels--;
Column 2, line 7, "angstrom" should be -- A. --;
           line 13, "silica,..." should be --silicas; other amorphous silicas, such as diatomaceous silica,--;
           line 41, "m.$^2$/g.," should be --m$^2$/g--;
           line 62, "m.$^2$/g.," should be --m$^2$/g--;
Column 3, line 55, "perborate; buffers," should be --perborates; buffers;--
Column 4, line 12, "not limit" should be --not to limit--;

Column 5, line 3, "emery cloth" should be --Emery cloth--;
           line 4, "emery cloth" should be --Emery cloth--;
           line 45, "at percent RES" should be --as % RES--;
Column 6, line 74, "herein" should be --herebelow--;
Column 8, lines 21, 22 and 24, "SNF$_2$" should be --SnF$_2$--;
Column 9, line 6, "Example XI" should be --Example IX--.

Signed and sealed this 27th day of March 1973.

(SEAL)
Attest:

EDWARD M. FLETCHER, JR.          ROBERT GOTTSCHALK
Attesting Officer                   Commissioner of Patents